United States Patent [19]

Chon

[11] Patent Number: 5,144,590

[45] Date of Patent: Sep. 1, 1992

[54] BED CONTINUITY DETECTION AND ANALYSIS USING CROSSWELL SEISMIC DATA

[75] Inventor: Yu-Taik Chon, Houston, Tex.

[73] Assignee: B P America, Inc., Cleveland, Ohio

[21] Appl. No.: 742,356

[22] Filed: Aug. 8, 1991

[51] Int. Cl.⁵ .............................................. G01V 1/40
[52] U.S. Cl. ......................................... 367/57; 367/38; 367/49
[58] Field of Search .................. 364/421, 422; 367/38, 367/56, 57, 59, 49

[56] References Cited

U.S. PATENT DOCUMENTS

| | | | |
|---|---|---|---|
| 2,718,928 | 9/1955 | Weiss | 367/49 |
| 2,718,929 | 9/1955 | Weiss | 367/37 |
| 3,352,375 | 11/1967 | Krey | 367/56 |
| 3,858,167 | 12/1974 | Stas et al. | 367/58 |
| 4,214,226 | 7/1980 | Narasimhan et al. | 367/57 |
| 4,298,967 | 11/1981 | Hawkins | 367/57 |
| 4,351,035 | 9/1982 | Buchanan et al. | 367/14 |
| 4,562,540 | 12/1985 | Devaney | 364/421 |
| 5,005,159 | 4/1991 | Krohn | 367/57 |
| 5,062,084 | 10/1991 | Schoepf et al. | 367/57 |

*Primary Examiner*—Ian J. Lobo
*Attorney, Agent, or Firm*—Pravel, Gambrell, Hewitt, Kimball & Kreiger

[57] ABSTRACT

Continuity of subsurface formations or beds in the earth between existing wells is investigated. Seismic energy is sent from a seismic source in one of the wells at various selected fixed depths. A number of sensing geophones deployed at selected fixed depths in one or more adjacent wells detect the seismic energy as data. A frequency domain decomposition process is performed on the data in order to determine if any of the formations located between the wells function as waveguides for seismic energy within the frequencies of interest. Those formations exhibiting waveguide properties are indicated as continuous between the wells.

14 Claims, 10 Drawing Sheets

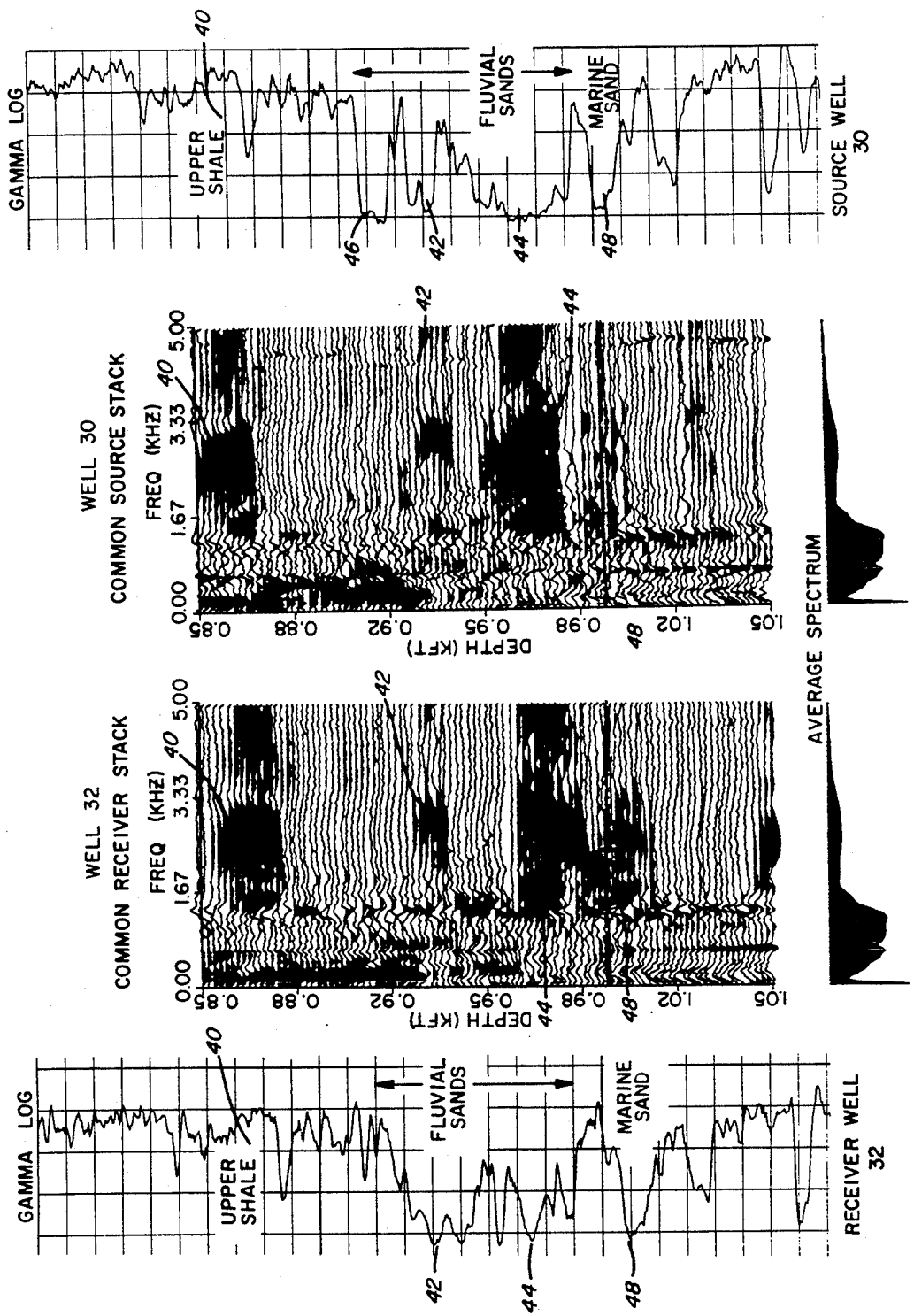

BED CONTINUITY DETECTION AND ANALYSIS USING CROSSWELL SEISMIC DATA

BACKGROUND OF INVENTION

1. Field of the Invention

The present invention relates to obtaining and processing of seismic data. More particularly, the present invention relates to determining possible continuity of subsurface earth formations or beds between existing wells, for reservoir evaluation purposes and the like.

2. Description of the Prior Art

It has long been desirable to analyze and evaluate structure and stratigraphy of petroleum producing formations. One purpose, for example, has been in conjunction with secondary and tertiary recovery operations. In recent years, there has been increased interest in seismic methods for reservoir definition and description. One method has been the crosswell seismic method where seismic energy emitted from sources in one well or borehole was sensed and recorded as seismic data by arrays of detectors in one or more other wells. The recorded seismic data were then processed to form tomographic images of interwell geologic features based on the crosswell seismic data.

Present techniques using crosswell seismic data have been based on tomographic reconstruction for interwell seismic velocity imaging. The tomographic imaging technique used for geophysical applications has been adapted from that used extensively in medical imaging.

When used for geophysical purposes, tomographic imaging between boreholes could produce very good images provided certain conditions were present. Unfortunately, in most petroleum reservoirs, these conditions have been quite difficult to achieve.

Since the imaging solutions were intended to produce two-dimensional results, the well boreholes had to be aligned; that is, the boreholes had to be vertical or both had to deviate in the same plane.

Another problem was that a large data sample or window of observed transmission energy was required. To obtain such data, the seismic source was required to emit energy in the source well to sensors in the receiver well or wells at depths of several hundred feet both above and below the target reservoir or formation of interest. Since it was rare for wells to be drilled deeper than the formations of interest, this condition was very hard to achieve.

The tomographic reconstruction or imaging process was based on an interwell velocity model. Such a model required precise positioning or location data for the well, in addition to the observed signal travel times. A final condition was accurate location data for the wells.

SUMMARY OF INVENTION

Briefly, the present invention provides a new improved method of locating continuities in earthen formations between wells using seismic data obtained from the wells. A seismic source emits seismic energy from a selected depth in a first or source well. Seismic detectors/receivers, either geophones or hydrophones, located in one or more receiver wells at selected fixed depths sense the seismic energy after travel through the earth from the source well. The sensed data are then recorded. The seismic source is then moved to several other depths in the source well, at each of which the process is repeated until a high multiplicity of ray coverage over the formation or bed of interest is achieved.

The recorded data are then processed, such as by Fourier transformation, to determine energy levels present across the spectrum of the signal. The transformed data are then gathered or stacked for each common source depth and common receiver depth for which data were recorded. The data for the various common source stacks and common receiver stacks in the well are then correlated, in effect forming a measure of a residual transfer function having certain spectral characteristics.

When a bed or formation of lower velocity than surrounding media is continuous between a source well and a receiver well, the bed serves as a waveguide. Transmitted energy entering a continuous formation at a source well has a higher amplitude and broader spectral content at the receiver well than energy from outside the formation.

When a formation is continuous, spectral characteristics at the source well should be in all substantial respects indistinguishable from those at the receiver well. When this occurs in a formation identifiable in the well from well logs, the formation is continuous between the two wells in question. When spectral features differ, there is a formation discontinuity at the depth between the wells. Differences in such spectral features can indicate the nature of the discontinuity.

BRIEF DESCRIPTION OF THE DRAWINGS

FIG. 9 is a gamma ray log over selected depths from a well.

FIG. 10 is a plot of a frequency spectrum processed according to the present invention from a crosswell seismic data from the well whose log is shown in FIG. 9.

FIG. 11 is a plot of a frequency spectrum processed according to the present invention from a crosswell seismic data from the well whose log is shown in FIG. 12.

FIG. 12 is a gamma ray log over selected depths from another well.

DESCRIPTION OF PREFERRED EMBODIMENT

At the outset, it is helpful to consider known crosswell surveying techniques. Crosswell seismic acquisition is currently performed at a number of discrete depths in the wells of interest. A typical survey makes a seismic measurement every two to ten feet over a target interval in subsurface formations or beds of interest, resulting in, for example, ten thousand seismic records during a survey.

Figure 1A:
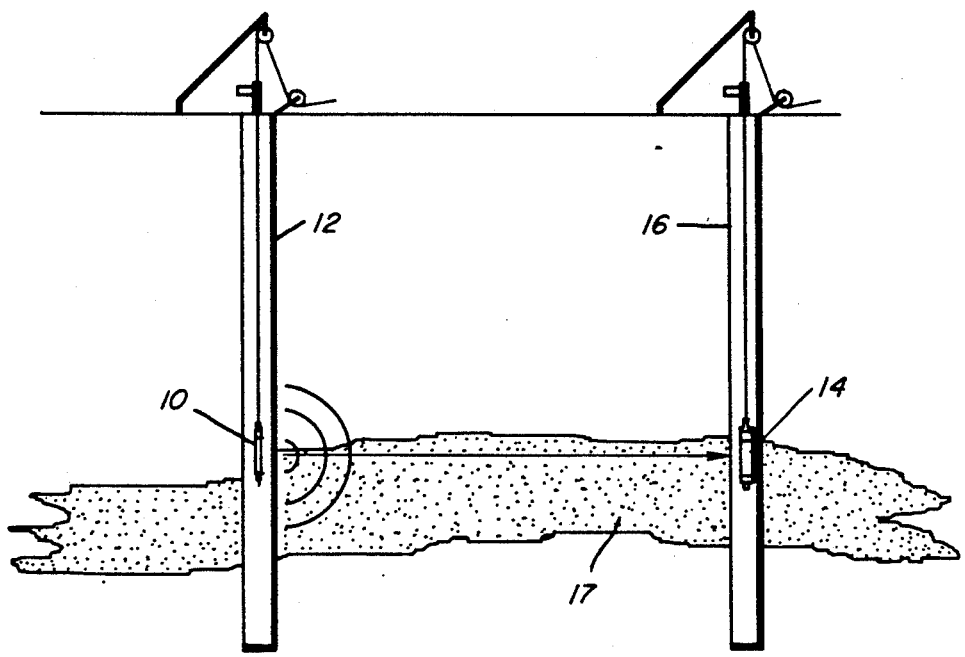
FIGS. 1A and 1B are schematic diagrams of prior art crosswell velocity logging geometry and coverage.

One typical purpose of a crosswell survey is to determine horizontal velocity variation as well as signal strength in the formations. In a simplified example (FIG. 1A), a seismic source 10 in a first well or borehole 12 and a seismic receiver 14 in a second well 16 are located at the same depth in the earth. For dipping environments or deviated wells, stratigraphic depth is considered to be the depth of interest.

The source 10 is activated to send a seismic signal, usually of a controlled frequency content or composition. It should be understood that numerous other seismic sources may also be used. Examples are air guns, water guns, small explosives sparker or arc discharge, swept frequency sources and the like.

Figure 1B:
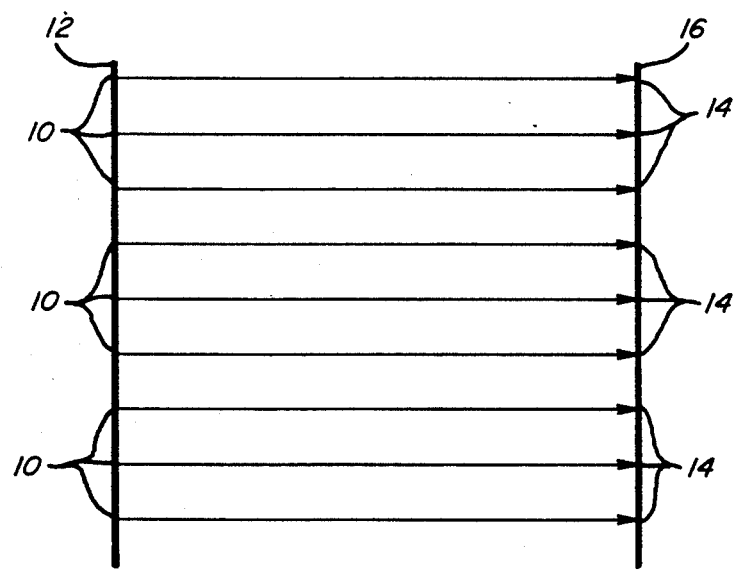

The seismic wave travels from the source 10 through subsurface formations until arrival at the receiver 14, where it is converted into an electrical signal which is recorded as a function of time. The source 10 and receiver 14 are moved to a different depth in their respective wells 12 and 16 and the procedure repeated until a full range of depths for the survey (FIG. 1B) is completed.

Figure 2:
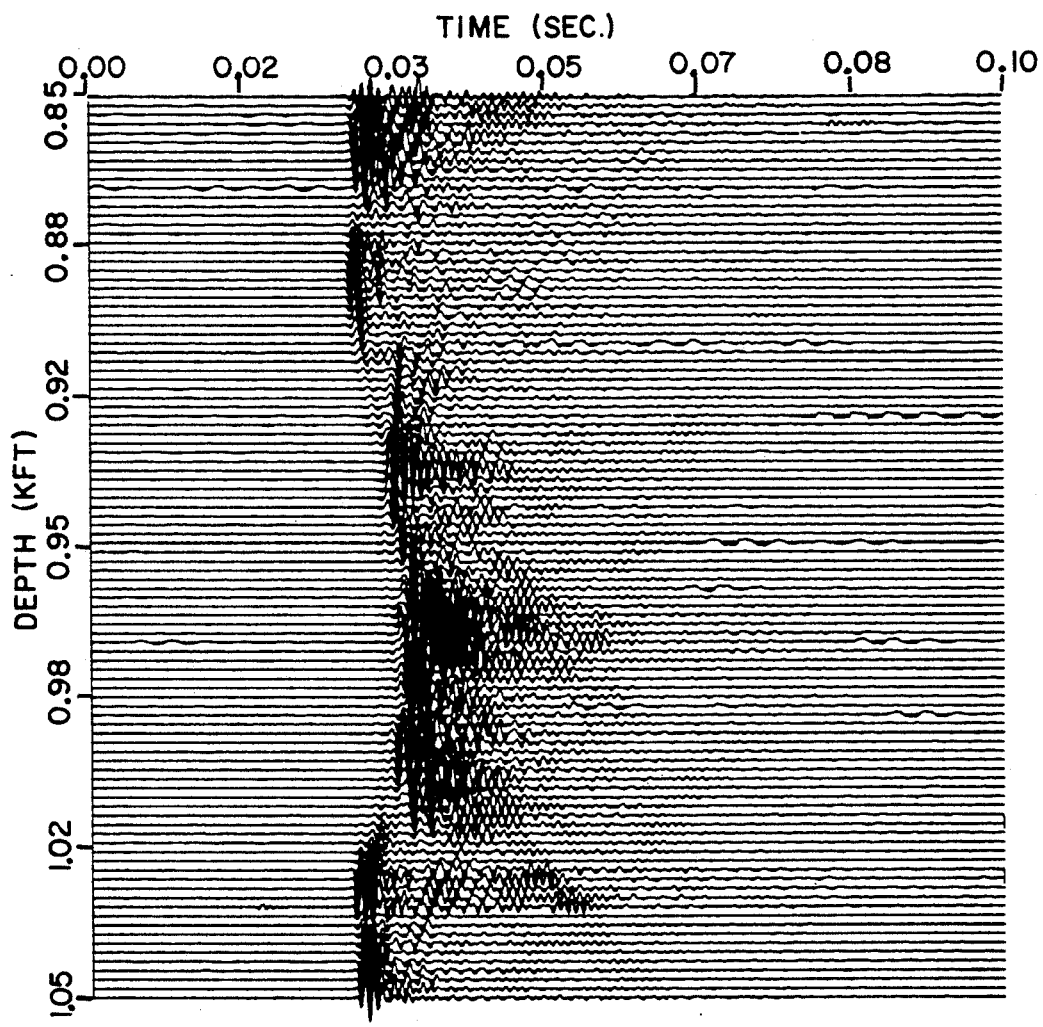
FIG. 2 is a plot of data obtained from a crosswell logging arrangement like that of FIGS. 1A and 1B.

A sample crosswell velocity log from an actual well is plotted (FIG. 2), representing a compilation of one hundred seismic recordings measured at two foot intervals in a well. Each of the recordings begins with a quiescent period until first arrival of seismic energy at the receiver 14 between twenty and thirty milliseconds after emission from the source 10. Delays in the first arrival times of signals at the various depths are indicative of the velocity contrast of the sandstone beds (in this example at depths from about 920 to 1000 feet) and the adjacent shale layers known to be above and below the sandstone beds in this region. The average formation velocities for each well depth can be determined from the first arrival times in these data and the known interwell spacing.

Figure 3A:
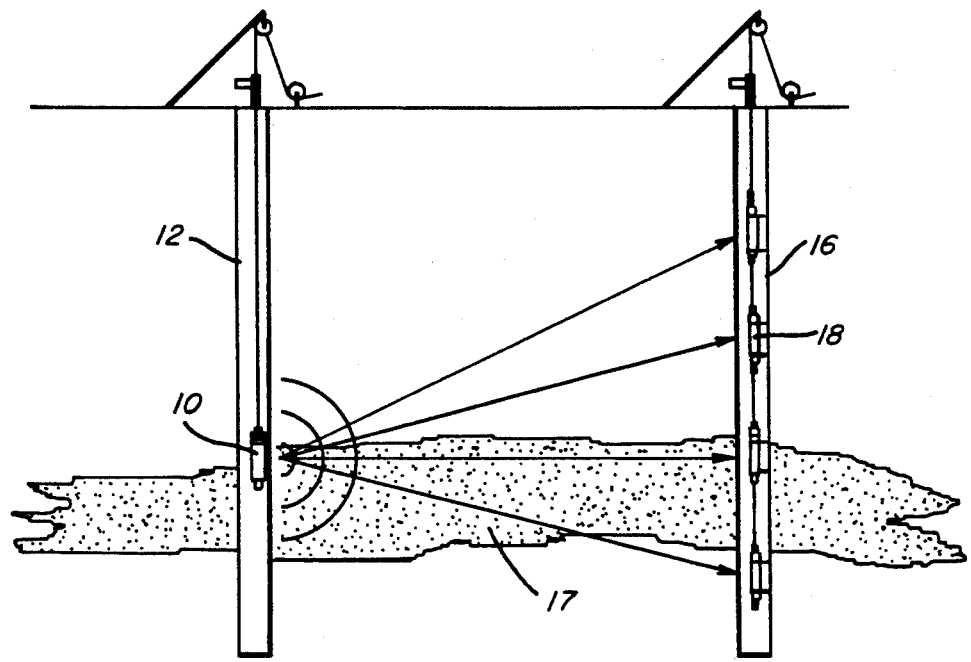
FIGS. 3A and 3B are schematic diagrams of prior art crosswell tomography geometry and coverage.
Figure 3B:
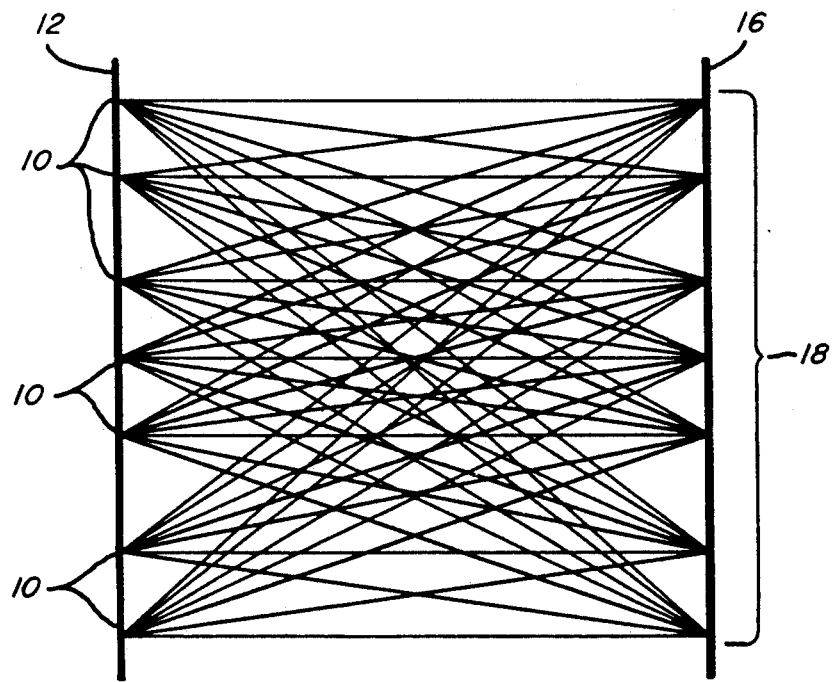

Acquisition of seismic data for tomographic reconstruction is much more intensive. Energy from the source 10 (FIG. 3A) at each position in the well 12 is sent and recorded into an array 18 of vertically spaced receivers at fixed depth intervals in the well 16. After each source emission, the source 10 is moved to a new depth and the receiver array 18 is illuminated with seismic energy from the source 10 at its new depth. Repeated transmission and recordation of seismic energy between wells results in a high multiplicity of seismic ray coverage over a target area of interest (FIG. 3B).

Figure 4:
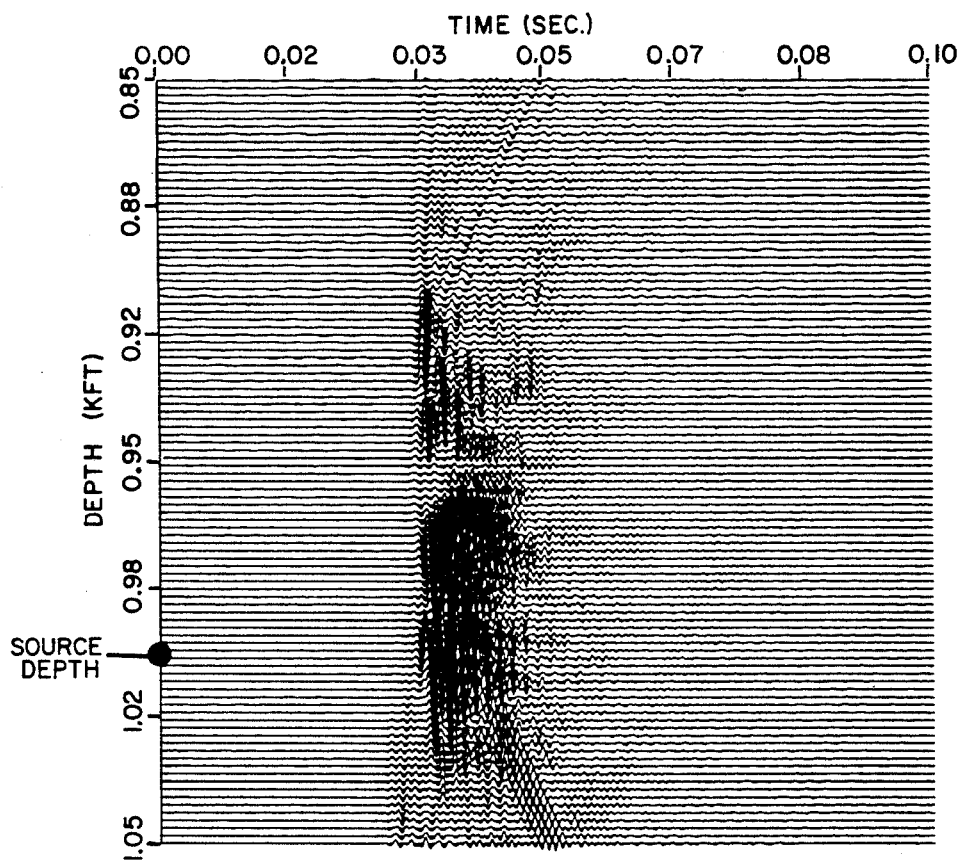
FIG. 4 is a plot of data obtained from a crosswell tomography arrangement like that of FIGS. 3A and 3B.

For example, a data display known as a common source fan, compiled from one source and multiple receiver recordings is shown in FIG. 4. Data sensed at one hundred receivers separated by a two foot interval are plotted. A total of one hundred common source fans formed in the foregoing manner, one for each of one hundred source depths in the well, are needed for a single tomogram.

Tomographic data obtained in this manner reveal a complex mixture of wave interactions as the seismic wave propagates through elastic formation media between the wells. These data are a composite of various acoustic and elastic waves from transmission, reflection and refraction paths. Identification of all modes of wave propagation in the recorded data is a quite difficult task, although necessary for a complete description of the geology. Present crosswell seismic tomographic methods make use of only a fraction of the information contained in the data, namely the first arrival time.

Analytically the first arrival time, which is the travel time for the compressional wave between a source and receiver, can be considered as an accumulation of slownesses in each increment or cell along the ray path. Tomographic inversion provides, as a solution, a spatial distribution of such slowness. The spatial distribution of slowness can be translated into a velocity profile between the source and the receiver well. The resolving power of tomographic imaging depends on the distribution of ray density in the object being imaged.

In medial tomography, the patient whose body is being imaged is normally placed at a fixed position and the scanning source moved about the patient for a sufficient number of scans to achieve requisite ray density. Unlike medical imaging, crosswell tomography is severely handicapped by limitations in ray coverage and in available view angles. The relative positions of source and receiver arrays in the boreholes are the primary cause of these limitations. An abundance of small aperture ray paths from the source at angles close to the horizontal and up to thirty or so degrees are possible. Vertical ray paths are limited in angle by the well depth and crosswell spacing, which of necessity also limits the size of available ray paths. These factors cause good tomographic resolution in the vertical direction, but poor resolution in the horizontal direction. In other words horizontal bed boundaries are well imaged but highly dipping beds or faults are poorly imaged.

Resolution is also poor near the top and the bottom of the survey depths where ray travel paths are by their nature limited to those which are predominantly horizontal. A tomographic solution may not provide useful results unless wells are drilled much deeper than the reservoir depth of interest. This has not been done in petroleum wells; little or no reason has existed to justify drilling below the lowest or deepest formation of interest.

Spectral characterization according to the present invention, however, permits an analyst to identify waveguide effects of low velocity channels and analyze their transmission characteristics for detecting bed continuity. When a low velocity formation is imbedded between high velocity layers, it becomes in effect a waveguide which traps seismic energy by the internal reflection at the upper and lower layer boundaries. Such a trapped wave is a channel wave of seismic energy which suffers little attenuation as it propagates along the waveguide. The amplitude of the channel wave, however, increases as the velocity contrast increases between the waveguide and adjacent layers. When discontinuities are encountered, such as a fault or a bed truncation, a part of the channel wave leaks into adjacent formations and is eventually attenuated as it propagates.

In a crosswell environment, the presence of channel waves indicates continuity of beds connecting a given source and receiver pair. The method of the present invention may thus be used to determine reservoir continuity and the continuity of a permeability barrier within any particular reservoir.

Figure 5:
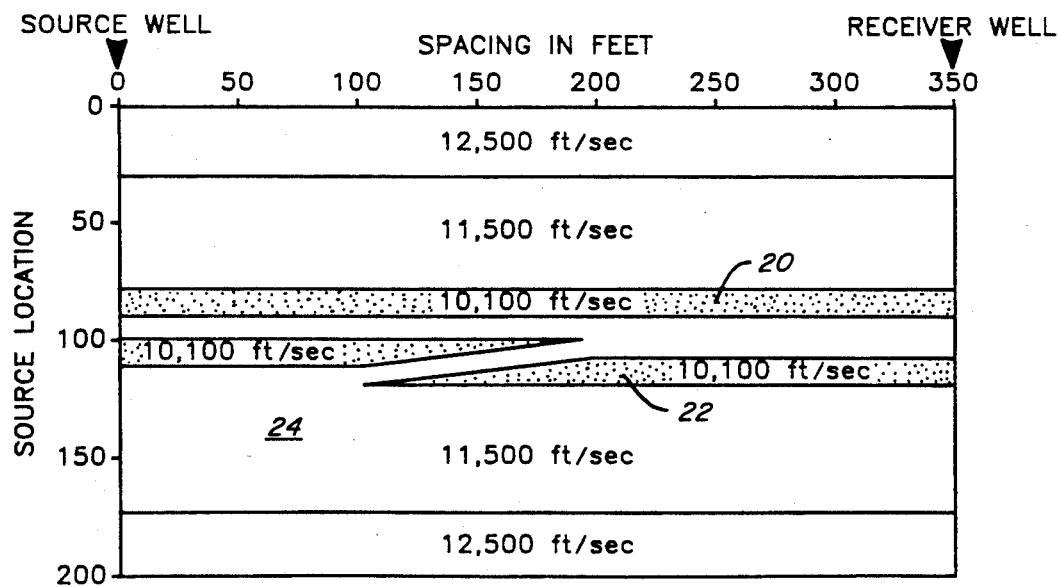
FIG. 5 is a velocity model of a section of the earth used in a computer simulation based on techniques according to the present invention.

A simulation of wave propagation in a low velocity layer between higher velocity layers, both with continuous and discontinuous beds, illustrates this phenomenon according to the present invention. A velocity model of an earth section (FIG. 5) shows two low velocity layers, a continuous bed 20 and another discontinuous bed 22 imbedded in layers 24 having a 15% higher background velocity. The dimensions of this model represent subsurface geometry at a known multiwell site, discussed below, where well to well spacing is about 350 feet and two water saturated layers which are approximately ten feet thick are present Two sets of crosswell seismograms were generated from the velocity model of FIG. 5. The first one was with a source in the continuous bed 20, and the synthetic waveforms resulting are plotted in FIG. 6A. the spectral response of this model in bed 20 is plotted in FIG. 6B. The second set of seismograms generated was with the source in the discontinuous bed 22, the results being plotted in FIG. 7A. FIG. 7B is a plot of the spectral response of this model in bed 22. The average spectrum of the seismic waves after transmission in this simulation is displayed for both FIG. 6B and FIG. 7B. These spectral character plots display the residual amplitude spectra present after subtracting the overall average source signal frequency spectrum.

IT is apparent on inspection that the channel wave is much weaker (FIG. 7B) in the discontinuous bed 22 than in that (FIG. 6B) of the continuous bed 20. Close examination reveals that the energy loss from transmission through the discontinuous bed 22 is in the higher frequency range, namely at wavelengths shorter than the width of the discontinuity. The low frequency components are transmitted across the gap, that is at wavelengths longer than the width of the discontinuity. The frequency dependent attenuation of seismic energy is evident in the spectral character plots displayed beneath the spectral response of the seismograms in FIGS. 6B and 7B.

These spectral plots are emphatic representations of spectral differences between the travel paths. It is clear that the continuous waveguide of formation 20 transmits all frequencies; while discontinuous bed 22 only transmits frequencies below 1 KHz. This frequency corresponds to a wavelength of 10 feet, the vertical width of the gap in the discontinuity, for a velocity of 10,000 feet per second. It can thus be seen that spectral analysis of crosswell data is useful in locating low velocity waveguides between boreholes and in determining the condition of these beds.

Unlike the synthetic example, waveguide effects are not easy to detect in raw seismic data, having a low signal-to-noise ratio. Signal processing according to the present invention, however, extracts waveguide effects from actual data using a residual transfer function analysis.

Consider, for example a crosswell survey composed of N sources and M receives, resulting in a data group of (N×M) seismograms. The frequency spectrum of the transmitted signal is defined as $P_{ij}(\omega)$ from the ith source to the jth receiver. The transmitted signal may be expressed as $$P_{ij}(\omega) = S_i(\omega) C_{ij}(\omega) R_j(\omega) \quad (1)$$

where, $S_i(\omega)$ represents the source response, $R_j(\omega)$ represents the receiver response, and $C_{ij}(\omega)$ is the transfer function of the waveguide connecting the ith source and the jth receiver.

In the logarithmic frequency domain, Equation (11) becomes $$P_{ij}(\omega) = S_i(\omega) + C_{ij}(\omega) + R_j(\omega) \quad (2)$$

where $P_{ij}(\omega)$, $S_i(\omega)$, $C_{ij}(\omega)$, and $R_j(\omega)$ are logarithms of $P_{ij}(\omega)$, $S_i(\omega)$, $C_{ij}(\omega)$, and $R_j(\omega)$ respectively.

For convenience, the transfer function $C_{ij}(\omega)$ can have two parts, such that:

$$C_{ij}(\omega) = T_{ij}(\omega) + T_o(\omega) \quad (3)$$

where $T_o(\omega)$ is the background transfer function averaged over the cross section between the source receiver wells and $T_{ij}(\omega)$ is the residual transfer function satisfying $$\Sigma_i \Sigma_j T_{ij}(\omega) = 0 \quad (4)$$

Since it is reasonable to consider that the source function S and the receiver response R are the same throughout the survey, $$S_i(\omega) = S_o(\omega) \text{ for all } i = 1, \ldots N \quad (5)$$

$$R_j(\omega) = R_o(\omega) \text{ for all } j = 1, \ldots M \quad (6)$$

Equation (2) may be rewritten with $C_{ij}(\omega)$ from Equation (3) as $$P_{ij}(\omega) = S_o(\omega) + T_{ij}(\omega) + T_o(\omega) + R_o(\omega) \quad (7)$$

Since $S_o(\omega)$, $T_o(\omega)$ and $R_o(\omega)$ are invariant of source and receiver locations, the sums of the invariant terms, $A_o(\omega)$, can be estimated by $$\begin{aligned} A_o(\omega) &= S_o(\omega) + T_o(\omega) + R_o(\omega) \\ &= \Sigma_i \Sigma_j P_{ij}(\omega)/(N \times M) \end{aligned} \quad (8)$$

The residual transfer function $T_{ij}(\omega)$, becomes $$T_{ij}(\omega) = P_{ij}(\omega) - A_o(\omega) \quad (9)$$

Figures 6A, 6B:
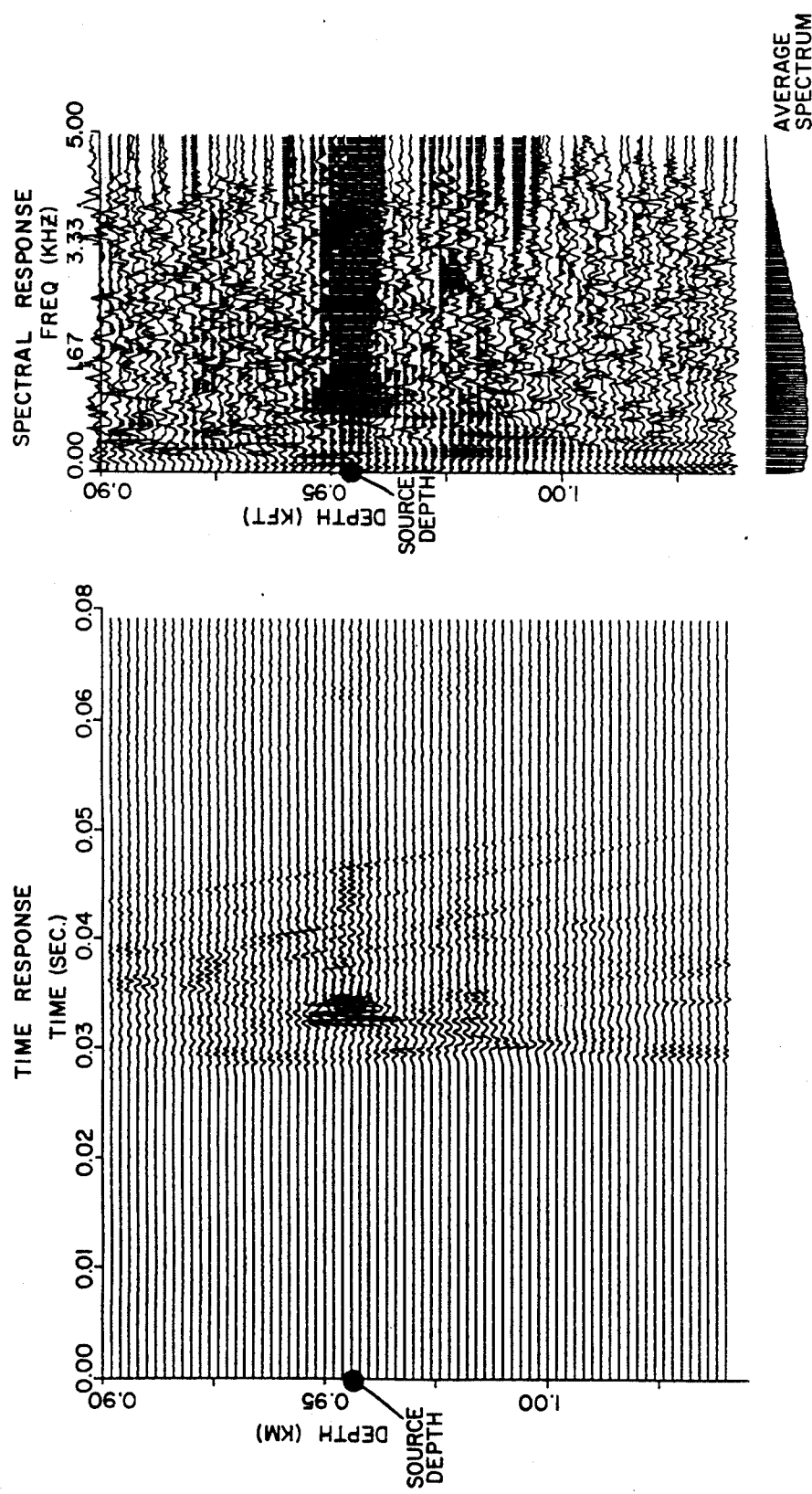
FIGS. 6A and 6B are the time response and spectral response from a portion of the velocity model of FIG. 5.
Figures 7A, 7B:
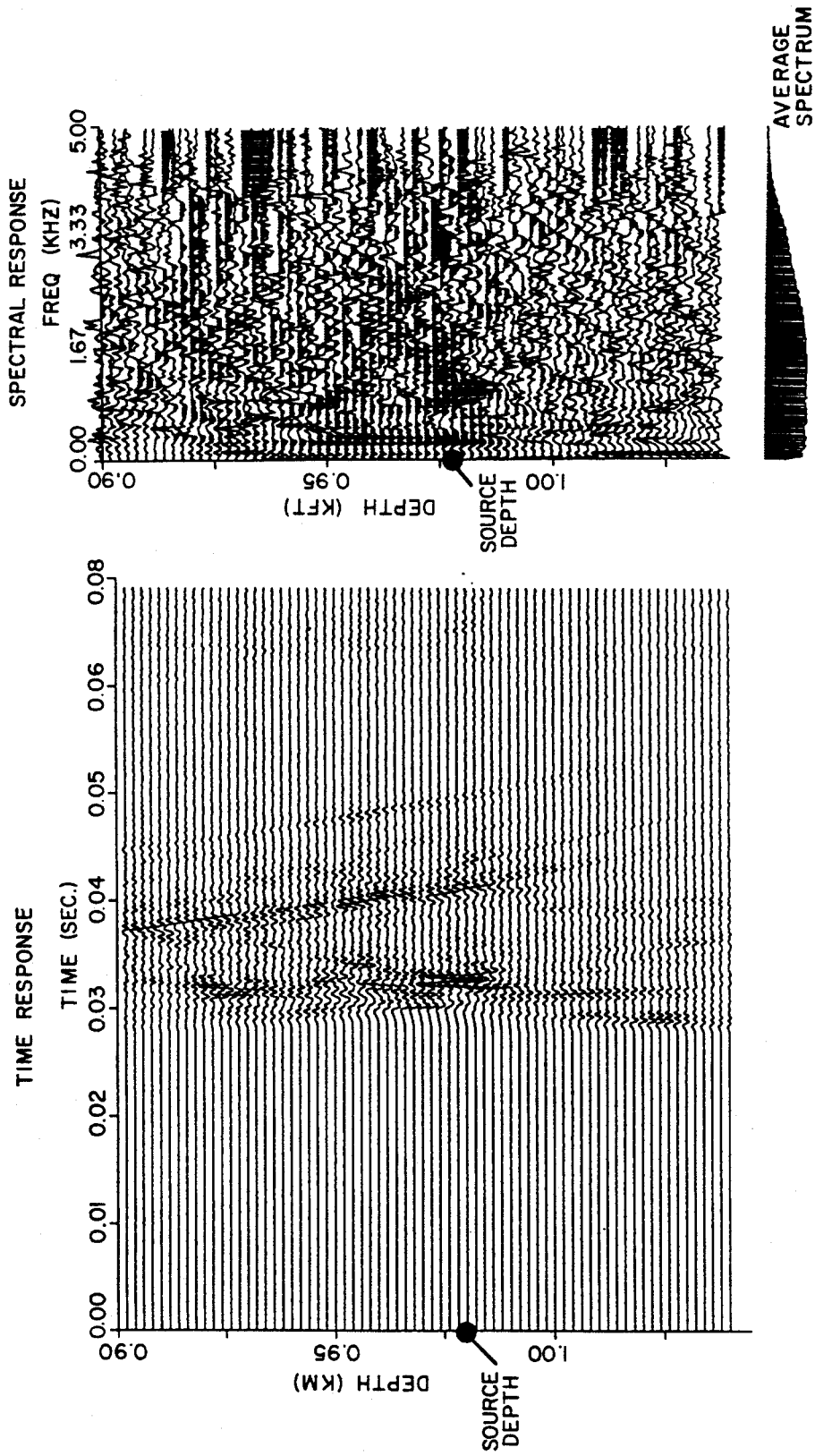
FIGS. 7A and 7B are the time response and spectral response from another portion of the velocity model of FIG. 5.

FIGS. 6B and 7B are plots of such residual from synthetic seismograms.

For actual data, raw estimates of residual transfer functions are too noisy and too numerous, typically on the order of 10,000, to be handled in interpretation. For better interpretation, further data processing is usually necessary.

Figure 8B:
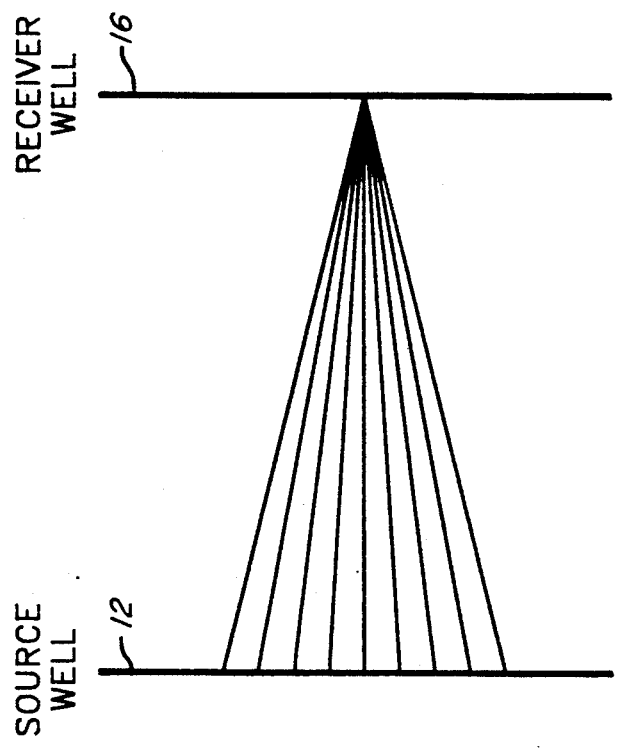
FIGS. 8A and 8B are ray diagrams from a common source fan and a common receiver fan formed according to the present invention.
Figure 8A:
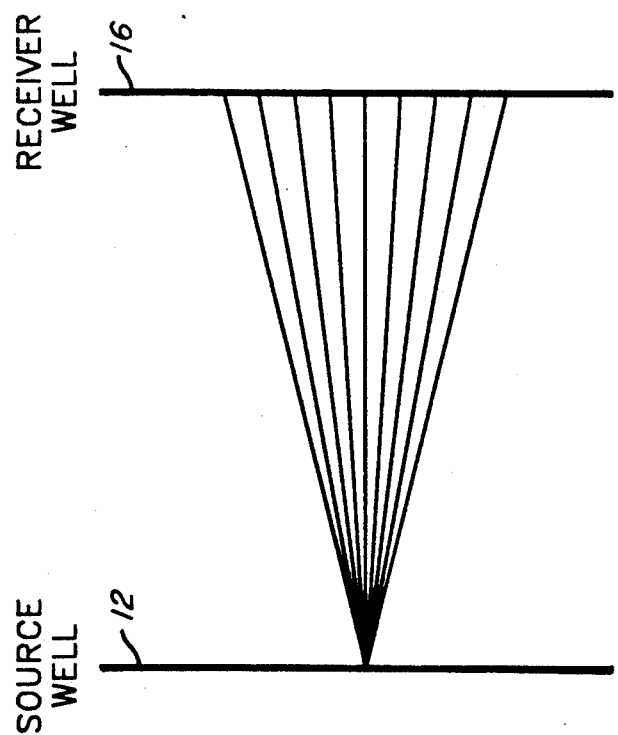

Spectral characterization for both an actual source well and an actual receiver well can be enhanced. For a source well, a common source stack is obtained by averaging the residual transfer functions for each common source fan (FIG. 8A). Similarly, a common receiver stack is formed by averaging the residual transfer functions for each common receiver fan (FIG. 8B).

The data group of seismograms can be assembled separately into a common source stack which is the response of all M receivers to energy emitted from the ith source, and a common receiver stack, representing the signals from all N sources received at the jth receiver.

Based on the foregoing, it is useful to once again consider a source within a waveguide as contrasts with a source that is outside the waveguide. Transmitted energy received between wells from a source in the waveguide has been seen to have larger magnitude and broader spectral content. Similarly, a receiver located in a waveguide receives more energy than one that is outside the waveguide. Spectral characteristics at each source location show the waveguide effects of beds encountered in the source well. The same analytic process is applied to the receiver locations for evaluating beds encountered in the receiver well.

When a waveguide is continuous between the source and receiver wells, spectral characterization at the source well should be identical to that evaluated at the receiver well. This results from energy being confined to the same beds in the waveguide. In other words, the spectral feature in the common source stack can also be found in the common receiver stack. Truncated waveguides cause there to be no match between the two spectral displays.

As a further step, a correlation is preferably performed between the spectral features present in the common source stack and those in the common receiver stack. Statistical cross-correlation in this manner enhances interpretation of the results.

Actual field data were obtained from wells at a site of known subsurface structure. A major geological feature is a sandstone interval composed of cross-bedded fluvial sandstones, approximately 200-600 feet wide and 10-25 feet thick. A well 30 was the source well and receivers in a well 32 were used to obtain crosswell data. The data sets included 10,000 records from 100 source locations and 100 receiver locations. The survey was sampled at depth intervals of two feet from borehole depths at 852 feet to 1050 feet. Formation velocities obtained from crosswell logs (FIG. 2) were in the range of 10,000 ft/sec to 12,000 ft/sec. The water-saturated sandstone beds form waveguides, since their velocities are lower than the intrabed shales.

The results of spectral characterization on crosswell data between wells 30 and 32 are displayed in FIGS. 9, 10, 11, and 12. FIG. 9 is a conventional gamma ray log over the depths of interest in receiver well 32, while FIG. 12 is a gamma ray log similarly obtained over the same depths in source well 30. FIG. 10 is a common receiver stack, that is $\Sigma_i T_{ij}(\omega)$, obtained from recordings for receiver well 32. FIG. 11 is a common source stack, that is $\Sigma_j T_{ij}(\omega)$, obtained for source well 30.

Several spectral features in the common source stack of FIG. 11 exhibit a good match with features in the common receiver stack of FIG. 10. These features occur between the bed boundaries and correlate well with the gamma ray logs of FIGS. 9 and 12.

A dipping shale layer 40 above the sands identifiable from the gamma ray logs shows a distinct spectral response in FIGS. 11 and 12 due to the waveguide effect. In the sandstone interval, sand bodies 42 and 44 seen in the source well 30 have communication with sands in the receiver well 32.

An upper sand 46 in the source well 30 appears to be isolated from other sand bodies in the formations of interest. There is no apparent communication with the sands in the receiver well 32. A lower formation 48 also shows crosswell connectivity but not over the full range of the frequency spectrum.

Figure 13:
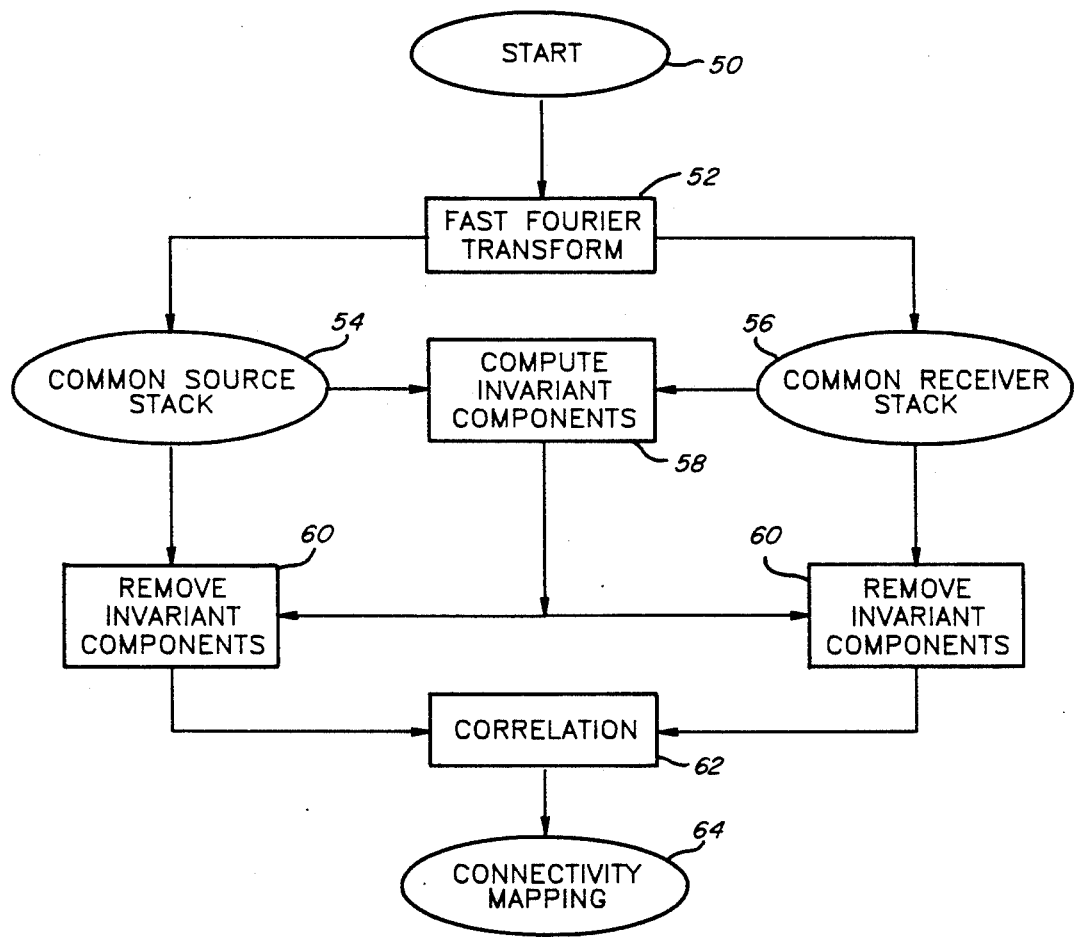
FIG. 13 is a flow chart of the steps of processing crosswell seismic data according to the present invention.

A flow chart F (FIG. 13) shows the sequence of steps performed in a general purpose digital computer to obtain spectral characterization of subsurface crosswell formations according to the present invention. After the recorded field data, obtained in the manner set forth above, have been transferred into the computer and arranged in order for processing, a START instruction 50 assumes control of the computer and the spectral characterization process begins.

Control is then transferred to an instruction 52 which causes a Fourier transformation to be performed on the recorded data. A suitable such transformation is the Fast Fourier Transformation, or FFT, known as the Cooley-Tukey process. Control is then transferred in parallel to instructions 54 and 56 which cause common source stacks to be formed for each source depth in the source well 30 and common receiver stacks to be formed for each receiver depth in the receiver well or wells.

Control is then transferred to an instruction 58 which causes a measure of the invariant components from the recorded data to be formed in the manner described above. Instruction 60 then assumes control of the computer and causes the measure of the invariant components formed during step 58 to be removed from the common source and common receiver stacks formed during steps 54 and 56.

The results of performing step 60 may then be plotted, resulting in displays like those of FIGS. 10 and 11, which can be analyzed in conjunction with well log data as set forth above.

As an alternative, a CORRELATION step 62 may be performed to correlate the spectral features in the common source and common receiver stack for each depth in the crosswell data as a final processing step 62. The results of performing step 62 may then plotted during a CONNECTIVITY MAPPING step 64, resulting in a display such as FIG. 14, where the relative correlation between spectral characteristics in the common source data from FIG. 11 and the common receiver data from FIG. 10 are shown. As exemplified by a calibration reference scale, low correlation is indicated a low density or relatively light portion of the display, while high density portions of the display indicate high correlation between the spectral characterizations.

Figure 14:
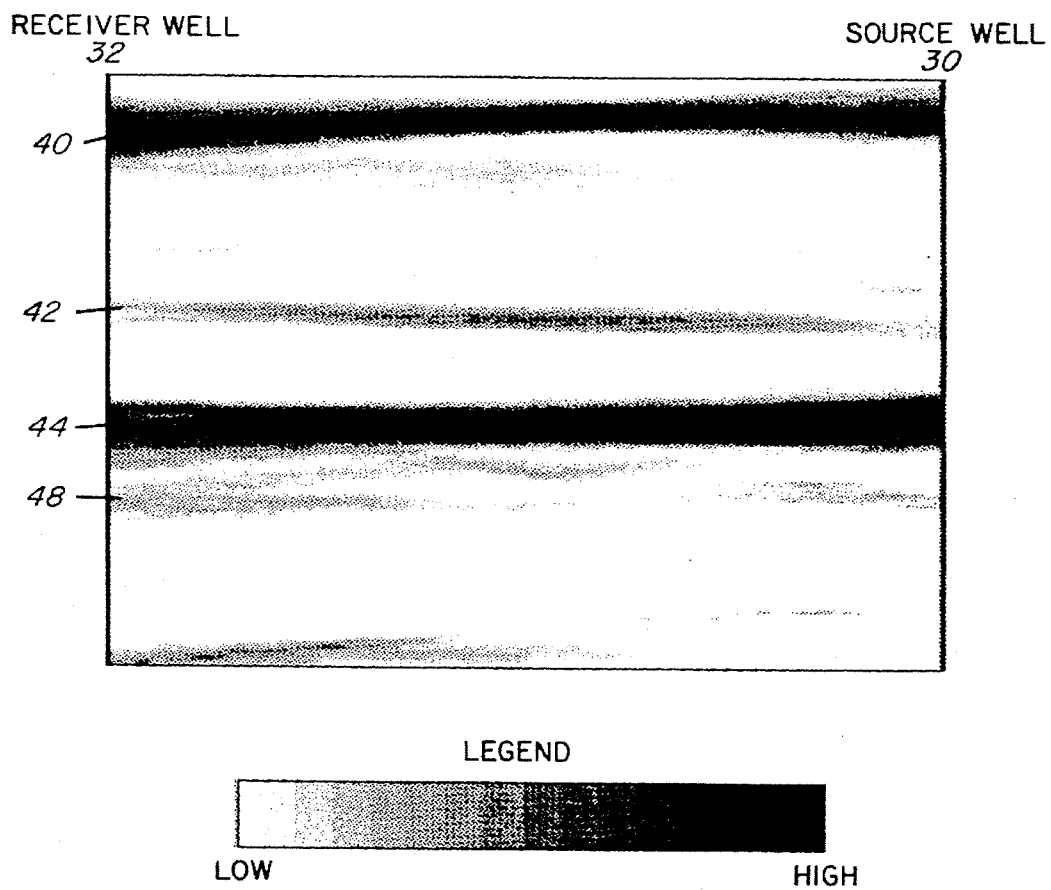
FIG. 14 is a display of data processed and plotted according to the present invention indicative of continuous subsurface beds between the two wells whose logs are shown in FIGS. 9 and 12.

The measure of correlation displayed is in effect a measure of relative formations connectivity between well 30 and 32. It is to be noted that the display in FIG. 14 indicates depth connectivity in the same areas as layers 40 and 48 and sand bodies 42 and 44 in FIGS. 11 and 12. It should be understood that the display of FIG. 14 is not a seismic section of reflection data nor a tomographic reconstruction, but rather an indication as a function of depth of the relative correlation between crosswell data for common source stacks and receiver stacks.

The present invention thus serves as an alternative method for evaluating interwell geology. It makes use of waveguide effects formed in low velocity layers, analyzing them by a spectral characterization process. The present invention is not sensitive to borehole position errors or non-planar borehole deviation. The present invention is also effective with smaller energy apertures than those needed for tomographic analysis techniques. As a result, limited well depths below reservoirs of interest are not a limiting factor. Spectral characterization according to the present invention utilizes the entire waveform to extract information about bed continuity. It also does not require a wide aperture survey to detect bed continuities.

Having described the invention above, various modifications of the techniques, procedures, material and equipment will be apparent to those in the art. It is intended that all such variations within the scope and spirit of the appended claims be embraced thereby.

I claim:

1. A method of determining continuity of subsurface formations between well boreholes, comprising the steps of:
   (a) imparting seismic energy into the earth from one of the boreholes at selected depths;
   (b) receiving in at least one other borehole at a plurality of selected depths seismic energy sent during said step of imparting;
   (c) obtaining a measure of the frequency spectrum of the seismic energy as imparted and received to form a frequency spectrum characteristic at selected depths in the formations;
   (d) assembling common source stacks of the obtained measures of the frequency spectrum of the seismic energy received at the selected depths in the formations;
   (e) assembling common receiver stacks of the obtained measure of the frequency spectrum of the seismic energy imparted at the selected depths in the formations; and
   (f) plotting the assembled common source and common receiver stacks of the frequency spectrum of the seismic energy so that formations having related frequency spectra which are indicative of formation continuity between the boreholes may be detected.

2. The method of claim 1, wherein said step of imparting comprises the step of:
   imparting seismic energy in the form of a controlled frequency signal.

3. The method of claim 2, wherein said step of receiving comprises the step of:
   receiving seismic energy in the form of a controlled frequency signal.

4. The method of claim 1, wherein said step of imparting comprises the step of:
   imparting seismic energy into the earth from one of the boreholes at each of a plurality of selected depths.

5. The method of claim 4, wherein said step of receiving comprises the step of:
   receiving in at least one other borehole at each of a plurality of selected depths seismic energy sent during said step of imparting at each of a plurality of selected depths.

6. The method of claim 1, further including the steps of:
   obtaining a measure of the invariant components of the seismic energy as imparted and received over the entire selected depths in the formations.

7. The method of claim 6, further including the step of:
   removing the invariant components from the frequency spectrum characteristic at selected depths in the formations.

8. The method of claim 1, wherein said steps of obtaining comprises the step of:
   forming a measure of a residual transfer function of the subsurface formations at selected depths to the seismic energy imparted and received.

9. The method of claim 8, further including the step of:
   forming an average residual transfer function of the subsurface formation at a common one of the sending depths.

10. The method of claim 8, further including the step of:
    forming an average residual transfer function of the subsurface formation at a common one of the receiving depths.

11. The method of claim 1, further including the step of:
    forming a measure of the correlation of the collected frequency spectra of seismic energy sent and received in the formations.

12. The method of claim 11, further including the step of:
    forming a display of the measured correlation of the collected frequency spectra of seismic energy.

13. A method of determining the connectivity of subsurface formations between well boreholes, comprising the steps of:
    (a) imparting seismic energy into the earth from one of the boreholes at selected depths;
    (b) receiving in at least one other of the boreholes at a plurality of selected depths seismic energy sent during said step of imparting;
    (c) obtaining a measure of the frequency spectrum of the seismic energy as imparted and received to form an energy spectrum characteristic of the seismic energy at selected depths in the formation;
    (d) assembling common source stacks of the obtained measures of the frequency spectrum of the seismic energy received at the selected depths in the formations;
    (e) assembling common receiver stacks of the obtained measures of the frequency spectrum of the seismic energy imparted at the selected depths in the formations; and
    (f) plotting assembled common source and common receiver stacks of the frequency spectrum of seismic energy so that formations having related frequency spectra which are indicative of formation continuity between the boreholes may be detected to indicate connectivity of such formations.

14. The method of claim 13, further including the step of:
    forming a display of the connectivity of the formations between the well boreholes.

* * * * *